(12) United States Patent
Matsuo (10) Patent No.: US 9,109,306 B2
(45) Date of Patent: Aug. 18, 2015

(54) METHOD OF COATING METAL FILAMENT WITH RUBBER, METHOD OF PRODUCING CORD, CORD, RUBBER COATING APPARATUS AND CORD PRODUCING APPARATUS

(71) Applicant: Hiroyuki Matsuo, Nasushiobara (JP)

(72) Inventor: Hiroyuki Matsuo, Nasushiobara (JP)

(73) Assignee: BRIDGESTONE CORPORATION, Tokyo (JP)

( * ) Notice: Subject to any disclaimer, the term of this patent is extended or adjusted under 35 U.S.C. 154(b) by 250 days.

(21) Appl. No.: 13/853,611

(22) Filed: Mar. 29, 2013

(65) Prior Publication Data

US 2013/0219850 A1 Aug. 29, 2013

Related U.S. Application Data

(62) Division of application No. 12/679,136, filed as application No. PCT/JP2008/067008 on Sep. 19, 2008, now Pat. No. 9,003,849.

(30) Foreign Application Priority Data

Sep. 20, 2007 (JP) ................................ 2007-243968

(51) Int. Cl.
*D01D 11/00* (2006.01)
*B29D 30/38* (2006.01)
(Continued)

(52) U.S. Cl.
CPC ................ *D01D 11/00* (2013.01); *B29D 30/38* (2013.01); *D07B 1/062* (2013.01); *D07B 7/145* (2013.01); *B29C 47/0016* (2013.01); *B29C 47/025* (2013.01); *B29C 47/027* (2013.01);
(Continued)

(58) Field of Classification Search
CPC ............ D07B 1/16; D07B 1/162; D07B 3/00; D07B 3/08; D07B 7/14; D07B 2201/2024; B29C 47/0016; B29C 47/025; B29C 47/027; B29C 47/062; B29C 47/30
See application file for complete search history.

(56) References Cited

U.S. PATENT DOCUMENTS

| 885,219 A | 4/1908 | Bayne et al. |
| 2,040,105 A | 5/1936 | Ritzert |

(Continued)

FOREIGN PATENT DOCUMENTS

| CN | 1341179 A | 3/2002 |
| EP | 0 619 170 A2 | 10/1994 |

(Continued)

OTHER PUBLICATIONS

Chinese Office Action, dated Mar. 14, 2013, issued in corresponding Chinese Application No. 200880113218.0.

(Continued)

*Primary Examiner* — Edward Tolan
(74) *Attorney, Agent, or Firm* — Sughrue Mion, PLLC (57) ABSTRACT

An object of the present invention is to make it possible to provide a cord, in particular, a cord for reinforcing a rubber article in which rubber permeation properties are improved by coating filaments as constituents of the cord with rubber in a reliable and stable manner. The cord of the present invention is produced by, when the metal filament is guided to an extruder and extruded together with rubber from a mouthpiece of the extruder so that the metal filament is coated with the rubber, juxtaposing plural metal filaments in the mouthpiece and extruding the metal filaments together with rubber.

5 Claims, 6 Drawing Sheets

(51) Int. Cl.
   *D07B 1/06* (2006.01)
   *D07B 7/14* (2006.01)
   *B29C 47/00* (2006.01)
   *B29C 47/02* (2006.01)
   *B29K 21/00* (2006.01)
   *B29K 105/08* (2006.01)
   *B29L 29/00* (2006.01)
   *B29L 30/00* (2006.01)
   *B29C 47/10* (2006.01)
   *B29C 47/28* (2006.01)
   *B29C 47/08* (2006.01)
   *B29C 47/06* (2006.01)

(52) U.S. Cl.
   CPC .......... *B29C 47/065* (2013.01); *B29C 47/0898* (2013.01); *B29C 47/1036* (2013.01); *B29C 47/28* (2013.01); *B29D 2030/381* (2013.01); *B29K 2021/00* (2013.01); *B29K 2105/08* (2013.01); *B29L 2029/00* (2013.01); *B29L 2030/005* (2013.01); *D07B 2201/206* (2013.01); *D07B 2201/2016* (2013.01); *D07B 2201/2023* (2013.01); *D07B 2201/2024* (2013.01); *D07B 2201/2042* (2013.01); *D07B 2201/2046* (2013.01); *D07B 2201/2062* (2013.01); *D07B 2201/2081* (2013.01); *Y10T 428/2931* (2015.01)

(56) References Cited

U.S. PATENT DOCUMENTS

| | | | |
|---|---|---|---|
| 2,105,812 A * | 1/1938 | Gordon et al. | 264/171.16 |
| 2,563,113 A | 8/1951 | Hindin et al. | |
| 2,601,394 A | 6/1952 | Hansen | |
| 3,143,786 A | 8/1964 | Jones et al. | |
| 3,908,351 A * | 9/1975 | Carroll | 57/297 |
| 4,143,209 A | 3/1979 | Gerspacher et al. | |
| 4,274,821 A | 6/1981 | Kiemer | |
| 4,277,642 A * | 7/1981 | Piper et al. | 174/117 F |
| 4,471,527 A | 9/1984 | Nishijima | |
| 5,084,221 A * | 1/1992 | Matsuno et al. | 264/103 |
| 6,958,102 B2 * | 10/2005 | Imamiya | 156/177 |
| 7,056,110 B2 | 6/2006 | Abdallah | |
| 7,665,290 B2 * | 2/2010 | Ueda et al. | 57/314 |
| 2002/0134482 A1 | 9/2002 | Takagi | |
| 2002/0160213 A1 | 10/2002 | Imamiya et al. | |
| 2005/0147702 A1 | 7/2005 | Higashi | |
| 2007/0190260 A1 | 8/2007 | Imamiya et al. | |

FOREIGN PATENT DOCUMENTS

| | | | | |
|---|---|---|---|---|
| EP | 1 172 476 A1 | | 1/2002 | |
| JP | 52-33087 A | | 3/1977 | |
| JP | 53-51804 A | | 5/1978 | |
| JP | 08-103972 A | | 4/1996 | |
| JP | 9-137392 A | | 5/1997 | |
| JP | 2001-336076 A | | 12/2001 | |
| JP | 2002-266266 A | | 9/2002 | |
| JP | 2002-302884 A | | 10/2002 | |
| JP | 2002-302885 A | | 10/2002 | |
| JP | 2004-277923 A | | 10/2004 | |
| JP | 2005-193494 A | | 7/2005 | |
| JP | 2006-291424 A * | | 10/2006 | D07B 3/00 |
| WO | 2006/112395 A1 | | 10/2006 | |

OTHER PUBLICATIONS

U.S. Office Action, dated Apr. 4, 2013, issued in parent U.S. Appl. No. 12/679,136.
European Office Action issued in European Application No. 08832452.0 dated Sep. 18, 2014.
Extended European Search Report, dated Feb. 24, 2014, issued in European Patent Application No. 08832452.0.
Japanese Office Action dated Oct. 18, 2011 issued in Japanese Application No. 2007-243968 with English translation (6 pages).
Chinese Office Action issued in Chinese Application No. 200880113218.0 dated Jul. 13, 2012.
Search Report from the Chinese Examiner of Chinese Application No. 200880113218.0.
International Search Report of PCT/JP2008/067008 dated Dec. 16, 2008, 4 pages.

* cited by examiner

METHOD OF COATING METAL FILAMENT WITH RUBBER, METHOD OF PRODUCING CORD, CORD, RUBBER COATING APPARATUS AND CORD PRODUCING APPARATUS

CROSS REFERENCE TO RELATED APPLICATIONS

This application is a divisional of U.S. application Ser. No. 12/679,136, filed Apr. 15, 2010, which is a National Stage of International Application No. PCT/JP2008/067008 filed Sep. 19, 2008, claiming priority based on Japanese Patent Application No. 2007-243968, filed Sep. 20, 2007, the contents of all of which are incorporated herein by reference in their entirety.

TECHNICAL FIELD

The present invention relates to a method of coating a metal filament as a constituent of, for example, a cord for reinforcing a rubber article, with rubber, a method of producing a cord by twisting metal filaments as constituents of a cord by a filament twisting machine, a cord formed by twisting rubber-coated metal filaments by a filament twisting machine, a rubber coating apparatus for coating a metal filament with rubber, and a cord producing apparatus.

PRIOR ART

Various characteristics are required of a cord for reinforcing a rubber article, in particular, a cord serving for reinforcing a tire. A cord for reinforcing a tire is required, above all, to be capable of suppressing deterioration of cord durability, which deterioration is due to growth of corrosion caused by moisture which has entered inside the tire.

Specifically, when moisture enters the inside of a tire from an external damage of the tire and the moisture reaches a cord, the cord suffers from corrosion due to the moisture. In this situation, if there exists a clearance inside the cord, the moisture travels in the longitudinal direction of the cord via the clearance, thereby enlarging a corrosion area along the cord. As a result, durability of the cord deteriorates due to this corrosion.

Accordingly, in order to suppress corrosion of a cord, it is necessary to sufficiently fill a clearance inside the cord with rubber and prevent moisture from travelling along the longitudinal direction of the cord.

In view of this, JP 2002-302884 and JP 2002-302885 each propose a technology of coating respective filaments with unvulcanized rubber in an unvulcanized rubber coating machine; then parting the respective filaments coated with unvulcanized rubber by a line-parting machine (a guide) and supply the parted filaments to a buncher twisting machine; and simultaneously twisting these filaments coated with unvulcanized rubber by using the buncher twisting machine, to produce a cord.

Further, JP 2002-266266 proposes a technology of coating the periphery of a core as plural twisted filaments with unvulcanized rubber by using a rubber extruder; and twining by using a buncher twisting machine plural filaments, which are to form a sheath, around the core coated with unvulcanized rubber, to form a cord.

DISCLOSURE OF THE INVENTION

Problems to be Solved by the Invention

However, in the technologies disclosed in JP 2002-302884 and JP 2002-302885, since respective filaments are to be coated with unvulcanized rubber individually, unvulcanized rubber tends to come off from the filaments when the filaments coated with unvulcanized rubber are brought into contact with a guide during a process of converging the filaments through the guide, whereby the filaments end up with a state where they are not sufficiently coated with unvulcanized rubber. Further, since the unvulcanized rubber which has come off clogs the guide, there arises a possibility that the filaments may not be able to pass through the guide.

Further, in the case of the technology of JP 2002-266266, the twist originated by the buncher twisting machine is transmitted to the filaments which are to form a core when the periphery of the core is coated with rubber by the rubber extruder. For example, when three filaments are used, a core is coated with unvulcanized rubber in a state where the core has a twisted structure of 1×3. As a result, there arises a problem that a closed space, which is not filled with unvulcanized rubber, is generated in the core portion of the filaments.

In view of the problems above, an object of the present invention is to make it possible to provide a cord, in particular, a cord for reinforcing a rubber article in which rubber permeation properties are improved by coating filaments as constituents of the cord with rubber in a reliable and stable manner.

Means for Solving the Problems

As a result of a keen study of means for achieving the aforementioned object, the inventors of the present invention have discovered that filaments can be coated with rubber in a reliable and stable manner by laying the filaments horizontally and coating these filaments with rubber at a time when the filaments are coated with rubber and suppressing twisting of the filaments originated by a twisting machine when the filaments are twisted to a cord, to complete the present invention.

Specifically, the gist of the present invention is as follows:
(1) a method of coating a metal filament with rubber, characterized in that, when the metal filament is guided to an extruder and extruded together with rubber from a mouthpiece of the extruder so that the metal filament is coated with the rubber, plural metal filaments are juxtaposed in the mouthpiece and extruded together with rubber;
(2) a method of producing a cord, characterized in that, when a metal filament is guided to an extruder and plural metal filaments are juxtaposed in a mouthpiece of the extruder and extruded together with rubber from the mouthpiece and then the plural metal filaments thus coated with rubber are supplied to a filament twisting machine to produce a cord, a twist transmitted from the filament twisting machine to the metal filaments thus coated with rubber is eliminated on the outlet side of the mouthpiece;
(3) a method of producing a cord of (2) above, wherein the filament twisting machine is a buncher type machine;
(4) a cord having a twisted single-layered structure, formed by twisting plural metal filaments coated with rubber by the method described of (1) above;
(5) a cord having a single twist double layered structure, formed by arranging plural metal filaments as a sheath around plural metal filaments as a core coated with rubber by the method of (1) above and twisting the core and the sheath simultaneously;
(6) a cord having a double twist double layered structure, formed by twisting plural metal filaments as a sheath around the cord as a core produced by the method of (2);

(7) a rubber coating apparatus including an extruder and a mouthpiece, characterized in that the mouthpiece has a width which allows plural metal filaments to be arranged in a juxtaposed manner.

(8) a cord producing apparatus including the rubber coating apparatus as described in (7) above and a filament twisting machine, characterized in that it further includes a twist-eliminating machine disposed on the outlet side of the rubber coating apparatus, for eliminating a twist transmitted from the filament twisting machine to a metal filament.

(9) the cord producing apparatus of (8) above, wherein the twist-eliminating machine is a multiple groove pulley system.

According to the present invention, plural metal filaments can be coated with rubber in a reliable and stable manner by juxtaposing plural metal filaments in a mouthpiece of an extruder and coating these juxtaposed metal filaments with rubber at a time. As a result, the metal filaments can be twisted to form a cord without experiencing the rubber peeling off therefrom. Further, twisting of a metal filament can be suppressed by eliminating on the outlet side of the mouthpiece a twist transmitted from a filament twisting machine to the metal filament, whereby the filament can be coated with rubber in a reliable and stable manner. As a result, a cord having excellent durability can be obtained.

EXPLANATION OF REFERENCE NUMERALS

1 Metal filament
1a Metal filament coated with rubber
1b Metal filament which is to form sheath
2 Rubber coating apparatus
3 Rubber
4 Twist eliminating apparatus
5 Guide
6 Converging portion
7 Filament twisting machine
8 Cord
9 Mouthpiece
10 Multiple groove pulley
11 Spool

BEST MODE FOR IMPLEMENTING THE INVENTION

Figure 1:
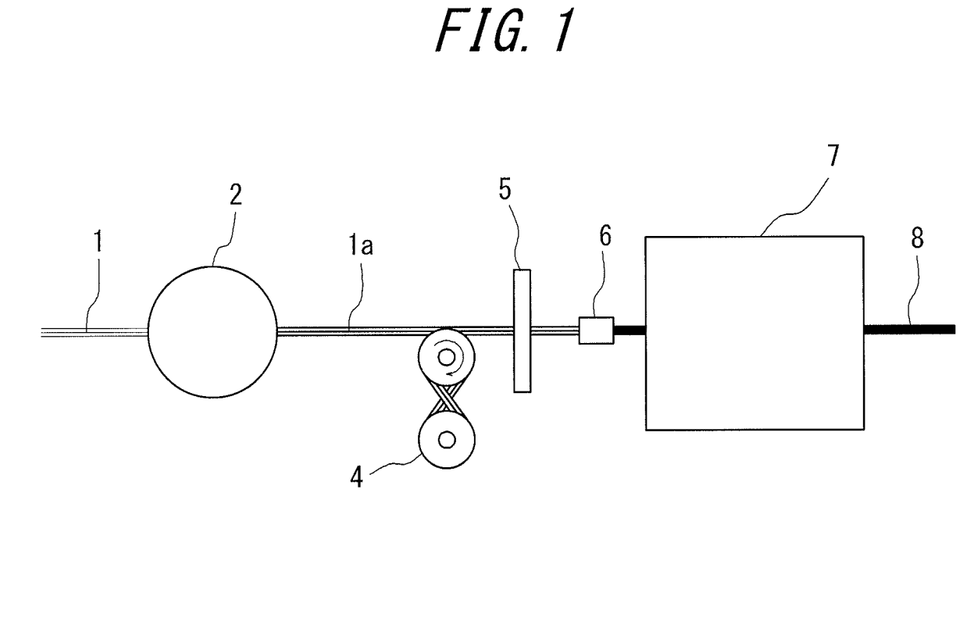
FIG. 1 is a view showing a method of producing a cord according to the present invention.

The present invention will be described in detail hereinafter. A method of coating metal filaments with rubber of the present invention will be described with reference to the drawings. First, FIG. 1 shows a process of twisting metal filaments to produce a cord. In FIG. 1, plural (three in the drawing) metal filaments 1 are supplied to a rubber coating apparatus 2 so that the metal filaments 1 are coated with rubber 3, and the metal filaments 1a coated with rubber 3 are made to pass through a guide 5 via a twist-eliminating machine 4. The metal filaments 1a are then converted by a converging portion 6, supplied to a filament twisting machine 7 and twisted by the filament twisting machine 7, whereby a cord 8 is produced.

Figure 2:
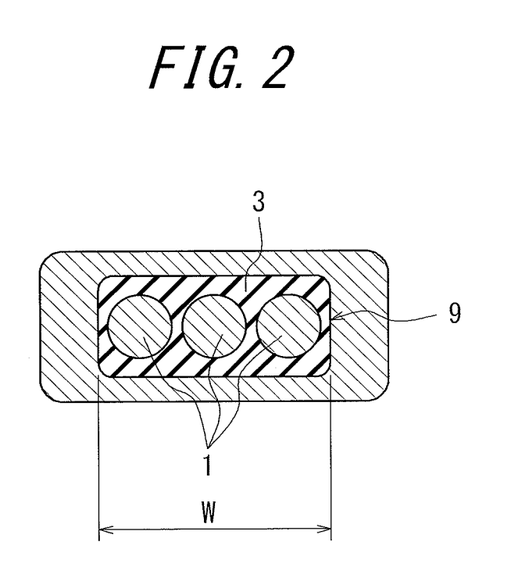
FIG. 2 is a view showing a section in the widthwise direction of a mouthpiece.

Herein, a process of coating the metal filament 1 with rubber will be described in detail with reference to FIG. 2. The rubber coating apparatus 2 has an extruder for simultaneously extruding the metal filaments 1 introduced thereto and rubber, and a mouthpiece for restricting a configuration of extrusion. FIG. 2 shows only the mouthpiece because the extruder has a conventional structure. Specifically, as shown in a sectional view in the widthwise direction of the mouthpiece 9 in FIG. 2, the mouthpiece 9 has an opening width which allows plural metal filaments 1 to be introduced to the mouthpiece 9 from the inlet side thereof in a manner that the metal filaments 1 are juxtaposed within the mouthpiece 9, so that the peripheries of the metal filaments 1 are coated with these rubber 3 at a time and extruded as metal filaments 1a together with the rubber 3. In the present embodiment, in order to juxtapose the metal filaments 1 within the mouthpiece 9 for introduction thereof to the mouthpiece 9, the respective metal filaments 1 are preferably juxtaposed by using a guide prior to introduction thereof to the mouthpiece 9.

By juxtaposing the metal filaments 1 within the mouthpiece 9, coating the metal filaments 1 with rubber 3 and extruding the metal filaments 1a coated with rubber 3 as described above, the metal filaments 1a can be linearly supplied along a pass line linking the rubber coating apparatus 2 and the filament twisting machine 7 when the metal filaments 1a are supplied to the filament twisting machine 7, whereby the metal filaments 1a can be prevented from making contact with the guide 5. As a result, since contact of the metal filament 1a with the guide 5 is prevented, the rubber 3 does not come off from the metal filament 1a, whereby the metal filaments 1a each reliably coated with rubber can be supplied to the filament twisting machine 7.

Further, since metal filaments 1a travel without making contact with the guide 5, it is very unlikely that rubber which has come off from the metal filaments 1a clogs a through hole of the guide. Accordingly, a situation in which the rubber 3 clogs the through hole of the guide 5 such that the metal filaments 1a can no longer pass through the through hole of the guide 5 can be prevented from occurring.

Next, a procedure for producing a cord by twisting the metal filaments 1a coated with rubber according to the aforementioned method will be described. First, plural metal filaments 1 are juxtaposed in the mouthpiece 9 and extruded together with rubber. It is important that, when the metal filaments 1a are supplied to the filament twisting machine 7 to produce a cord, twist transmitted from the filament twisting machine 7 to the metal filament 1a is eliminated on the outlet side of the mouthpiece 9. Specifically, the metal filaments 1a are supplied to the filament twisting machine 7 via the twist-eliminating machine 4 for eliminating twist transmitted from the filament twisting machine 7, in particular, a buncher twisting machine to the respective metal filaments 1a, and the metal filaments 1a are twisted to produce a cord 8 by the filament twisting machine 7, whereby a cord inside of which is reliably filled with rubber can be produced.

Since twist transmitted from the filament twisting machine 7 to the metal filaments is eliminated, the metal filaments 1 are not twisted with each other when the metal filaments 6 are coated with rubber 3 within the mouthpiece 9. In other words, the metal filaments can be coated with rubber 3 without entangling with each other to create a closed space at the core thereof. As a result, the peripheries of the respective metal filaments 1 can be each reliably coated with the rubber 3, whereby, for example, in a case where a cord having 1×3 structure is produced by using three metal filaments, the three metal filaments are coated with rubber in advance and thus a cord of which center portions between the filaments are sufficiently permeated with rubber can be produced. Accordingly, growth of corrosion by moisture described above is suppressed and thus a cord having excellent durability can be produced.

In the present embodiment, in a case where the filament twisting machine used for twisting the metal filaments 1a each other in the cord production is a buncher-type machine, twist is inevitably generated in the metal filaments and thus application of the present invention is especially effective. The cord produced as described above will be a cord having a twisted single layered structure such as 1×n (n≥3).

Figure 3:
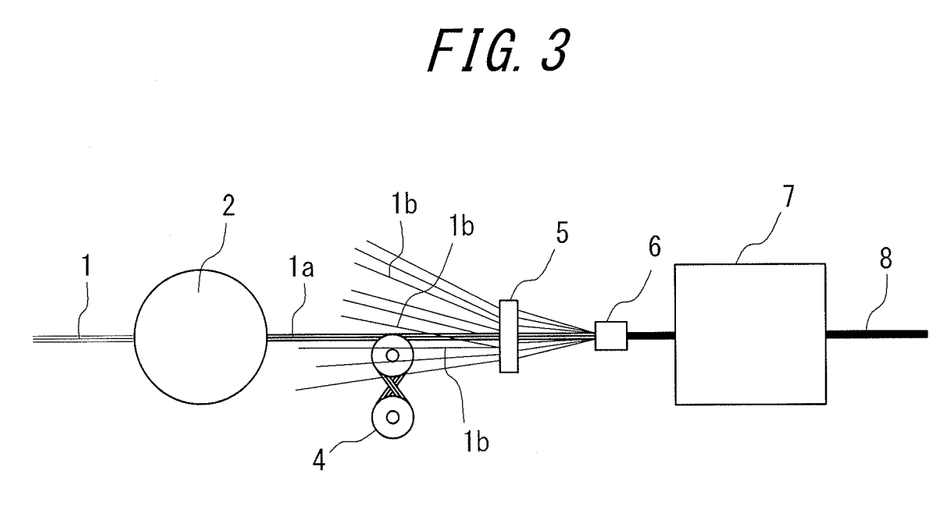
FIG. 3 is a view showing a method of producing a cord having a single twist double layered structure.

Further, another cord according to the present invention can be produced as shown in FIG. 3 by: introducing plural (nine in the drawing) filaments 1b, which are to form a sheath, to the periphery of the aforementioned metal filaments 1a coated with rubber and then to the guide 5; converging the metal filaments 1a and the metal filaments 1b in the converting portion 6; and then twisting the metal filaments 1a and the metal filaments 1b with each other simultaneously by the filament twisting machine 7, to produce a cord having a single twist double layered structure.

In short, in a case of a cord having a double layered structure, a cord structure where the inside of the core thereof is completely filled with rubber without voids can be realized by using the aforementioned metal filaments 1a as the core of a cord of a single twist double layered structure.

Figure 4:
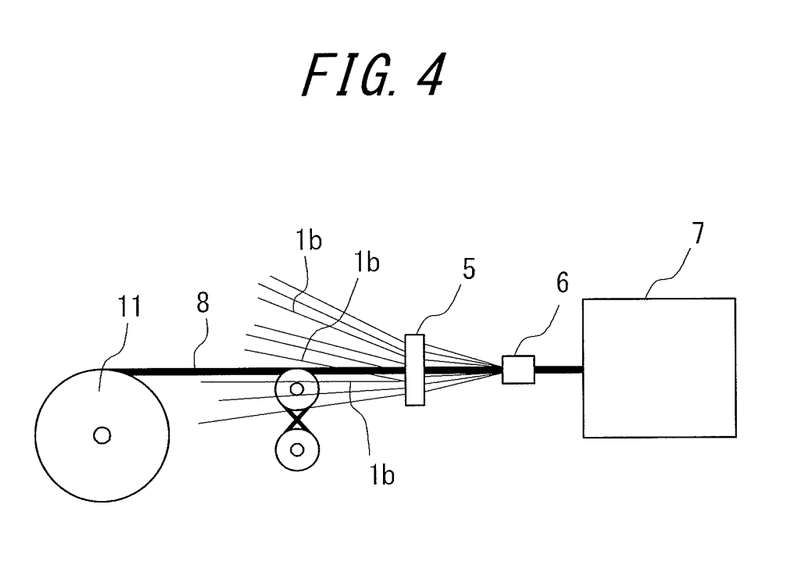
FIG. 4 is a view showing a method of producing a cord having a double twist double layered structure.
Figure 5:
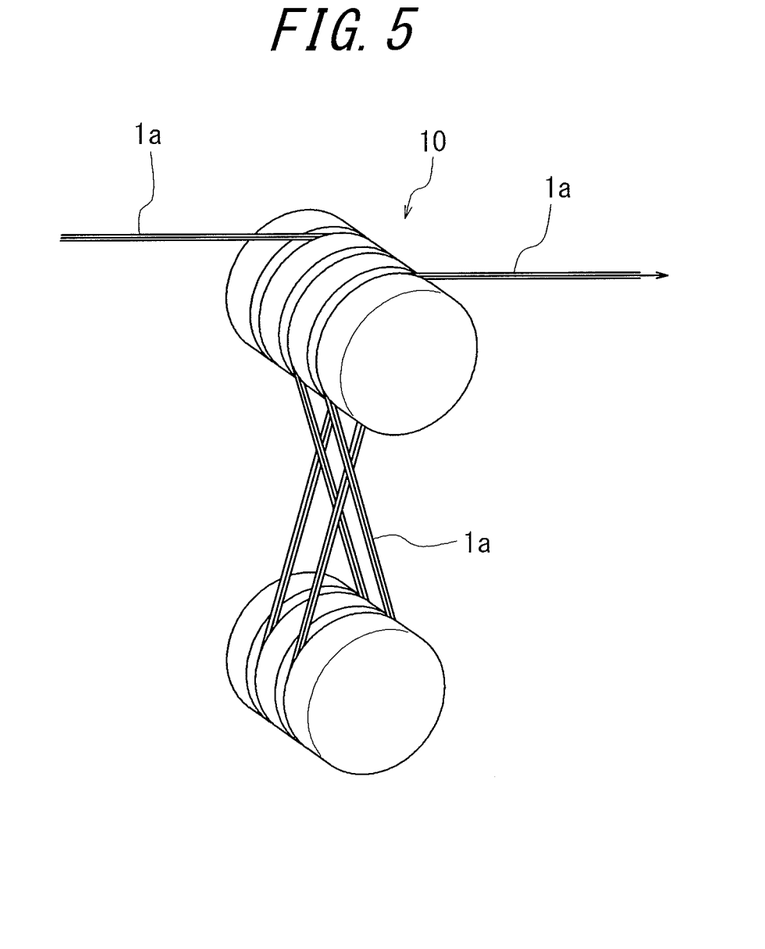
FIG. 5 is a view showing multiple groove pulleys.

Further, it is acceptable to once wind up a cord produced by a series of processes as shown in FIG. 1 on a spool, and in the process shown in FIG. 4, take the cord thus wound up on the spool 11 out of the spool 11, feed the cord to the twist-eliminating apparatus 4, then pass the cord through the guide 5, converge the metal filaments, which are to form a sheath, around the cord 8 in the converging portion 6, and twist the cord and the metal filaments by the filament twisting machine 7 to produce a cord having a double twist double layered structure using the cord wound up by the spool 11 as the core. The cord thus twisted may be pulled out of the filament twisting machine 7 and then wound up on a spool, or wound up on a spool inside the filament twisting machine 7.

The apparatus for coating plural metal filaments 1 with rubber 3 includes an extruder and a mouthpiece 9 as described above. It is essential that the mouthpiece 9 has a width which allows plural metal filaments 1 to be disposed in a juxtaposed manner in the mouthpiece 9.

Specifically, plural metal filaments 1 can be juxtaposed within the mouthpiece 9 and thus these metal filaments 1 can be coated with rubber 3 at a time because the mouthpiece 9 has a width which allows the plural metal filaments 1 can be disposed in a juxtaposed manner therein. As a result, the metal filaments 1 can avoid making contact with the guide 5 and thus a situation in which the rubber 3 comes off from the metal filaments 1a can be prevented from occurring.

Figure 6:
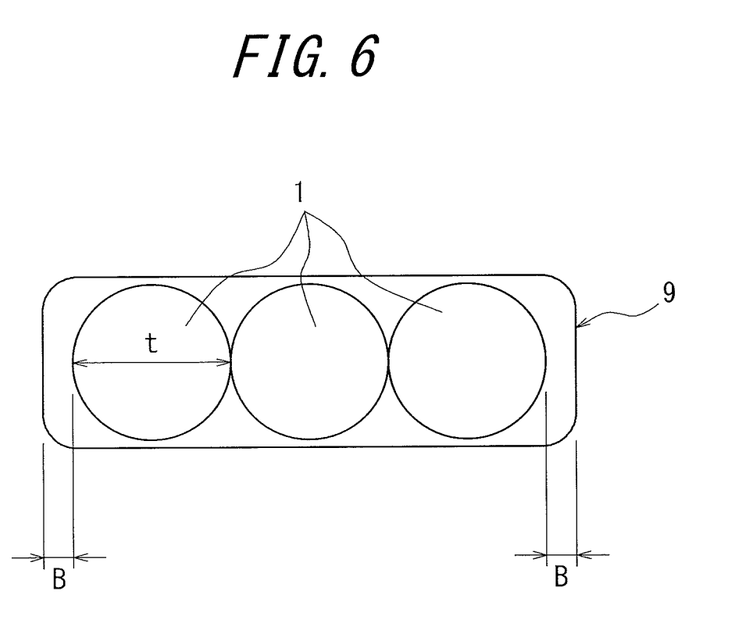
FIG. 6 is a view showing clearances between metal filaments and the mouthpiece.

In the present embodiment, the mouthpiece 9 in which plural metal filaments 1 can be disposed in a juxtaposed manner preferably has a width W calculated by formula (1) below. "A" in the formula (1) is a value calculated by formula (2) below in consideration B shown in FIG. 6.
Note:

Width $W$ (mm)=diameter $t$ (mm) of metal filament×
(number of metal filaments to be coated with
rubber−1)+$t$×$A$     (1); and $A$: (clearance $B$×2+diameter $t$ of metal filament)/diameter $t$ of metal filament     (2)

($A$ is preferably equal to or larger than 1.2)

Further, its is important to provide, on the outlet side of the rubber coating apparatus 2, the twist-eliminating machine 4 for eliminating transmission of twist from the filament twisting machine 7 in a cord producing apparatus including the rubber coating apparatus 2, having the extruder and the mouthpiece, and the filament twisting machine 7. Twist transmitted from the filament twisting machine 7 to the metal filaments can be eliminated by providing on the outlet side of the rubber coating apparatus 2 the twist-eliminating machine 4 for eliminating transmission of twist. As a result, each respective metal filament 1 is coated with rubber 3 in a state where the metal filament is not twisted in the process of coating the metal filament 1 with rubber 3 by the rubber coating apparatus 2, whereby coating with rubber can be effected in a reliable and stable manner.

The twist-eliminating machine 4 for eliminating twist transmitted from the filament twisting machine 7 to the metal filaments can eliminate twist from the filament twisting machine 7 as long as the machine 4 is provided between the outlet side of the rubber coating apparatus 2 and the guide 5. Therefore, the disposition of the twist-eliminating machine 4 is not restricted to the position shown in FIG. 1 or FIG. 3.

As the twist-eliminating machine as described above, multiple groove pulleys as shown in FIG. 4 can be used. Specifically, transmission of twist can be eliminated by making the metal filaments go through a vertical pair of multiple groove pulleys each having multiple grooves plural times.

EXAMPLES

Cords each having 3+9×022 (mm) structure were produced by using mouthpieces having widths calculated by substituting the A values shown in Table 1 for A in formula (1), respectively, by the cord producing process as show in FIG. 3, which process includes juxtaposing three metal filaments, coating the metal filaments with rubber and twisting nine metal filaments, which were to form a sheath, around the three metal filaments. Each of the cords thus obtained was evaluated for permeation properties of rubber. The results are shown in Table 1. Regarding a cord of Conventional Example, the metal filaments constituting the cord were coated with rubber by the conventional rubber coating method.

Permeation properties of rubber were evaluated by observing a rubber-coated area in a section of each cord cut in a direction orthogonal to the axial direction thereof.

TABLE 1

|  | Conventional Example | Present Example 1 | Present Example 2 | Present Example 3 |
|---|---|---|---|---|
| Value of A | — | 1.08 | 1.20 | 1.32 |
| Width W (mm) | — | 0.678 | 0.704 | 0.730 |
| Permeation of rubber | 15 | 67 | 82 | 98 |

From the results of Table 1, it is understood that permeation properties of rubber of the cords of Present Examples significantly improve as compared with those of Conventional Example.

The invention claimed is:
1. A method of producing a cord, characterized in that, when a metal filament is guided to an extruder and plural metal filaments are juxtaposed in a mouthpiece of the extruder and extruded together with rubber from the mouthpiece and then the plural metal filaments thus coated with rubber are supplied to a filament twisting machine to produce a cord, a twist transmitted from the filament twisting machine to the metal filaments thus coated with rubber is eliminated on the outlet side of the mouthpiece, wherein the mouthpiece has a width W calculated by Formula (1) and Formula (2), provided that B represents a clearance in a filament-juxtaposed direction between an outer peripheral edge of the mouthpiece and a corresponding outermost metal filament, and wherein:

Formula (1) is: width W (mm)=diameter t (mm) of metal filament×(number of metal filaments to be coated with rubber −1)+t×A Formula (2): A=(clearance B×2+diameter t of metal filament)/diameter t of metal filament.

2. The method of producing a cord of claim 1, wherein the filament twisting machine is a buncher type machine.

3. The method of producing a cord of claim 1, wherein A is equal to or larger than 1.2.

4. The method of producing a cord of claim 1, wherein the plural metal filaments coated with rubber are supplied from the mouthpiece to the filament twisting machine via a twist-eliminating machine, to produce a cord.

5. The method of producing a cord of claim 4, wherein the twist-eliminating machine is a multiple groove pulley system.

\* \* \* \* \*